United States Patent
Kurozasa

(10) Patent No.: US 12,273,489 B2
(45) Date of Patent: Apr. 8, 2025

(54) MANAGEMENT APPARATUS, MANAGEMENT SYSTEM, MANAGEMENT METHOD, AND STORAGE MEDIUM

(71) Applicant: SHARP KABUSHIKI KAISHA, Sakai (JP)

(72) Inventor: Yoshiharu Kurozasa, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/127,532

(22) Filed: Mar. 28, 2023

(65) Prior Publication Data
US 2023/0319198 A1    Oct. 5, 2023

(30) Foreign Application Priority Data
Mar. 29, 2022 (JP) ................. 2022-053642

(51) Int. Cl.
H04N 1/00 (2006.01)

(52) U.S. Cl.
CPC ..... *H04N 1/00344* (2013.01); *H04N 1/00954* (2013.01)

(58) Field of Classification Search
CPC .......... H04N 1/00344; H04N 1/00954; H04N 1/00002; G06F 3/1226; G06F 11/3055; G06F 11/3003
See application file for complete search history.

(56) References Cited

U.S. PATENT DOCUMENTS

| | | | |
|---|---|---|---|
| 11,296,971 B1* | 4/2022 | Jain | H04L 41/12 |
| 2014/0268226 A1 | 9/2014 | Yoshida et al. | |
| 2015/0077800 A1* | 3/2015 | Yamagishi | G06Q 30/0621 358/1.15 |
| 2016/0054963 A1* | 2/2016 | Hamada | H04L 67/1014 358/1.15 |
| 2017/0132500 A1* | 5/2017 | Takamoto | H04L 67/34 |
| 2017/0201635 A1* | 7/2017 | Takamoto | G06F 3/121 |
| 2018/0074807 A1* | 3/2018 | Sakurai | G06F 8/62 |
| 2018/0232678 A1* | 8/2018 | Chirayil | G06F 40/289 |

FOREIGN PATENT DOCUMENTS

JP    2014-191508 A    10/2014

* cited by examiner

*Primary Examiner* — Iriana Cruz
(74) *Attorney, Agent, or Firm* — ScienBiziP, P.C.

(57) ABSTRACT

A network system according to the present disclosure includes a plurality of multifunction peripherals as a plurality of electronic devices having agent functions and a management server as a management apparatus. Only the agent function of one of the multifunction peripherals is enabled, and the agent function of each of the other multifunction peripherals is disabled. The multifunction peripheral having the agent function enabled acquires the status information on each of the multifunction peripherals including itself and collectively sends the status information to the management server. This prevents an increase in the network traffic. Also, as the agent function of the multifunction peripheral having the agent function with the highest capability is enabled, smooth management is achieved.

15 Claims, 15 Drawing Sheets

| IP ADDRESS | VERSION | DETECTION DEVICE NUMBER | DEVICE NAME | OPTIMAL AGENT |
|---|---|---|---|---|
| aaa.bbb.ccc.10 | 1.00 | 5 | Dev-1 | — |
| aaa.bbb.ccc.11 | 1.00 | 5 | Dev-2 | — |
| aaa.bbb.ccc.12 | 2.00 | 5 | Dev-3 | SPECIFIED |
| aaa.bbb.ccc.13 | 2.00 | 3 | Dev-4 | — |
| aaa.bbb.ccc.14 | 1.30 | 3 | Dev-5 | — |

| ENABLED AGENT STORAGE AREA | Dev-3 |

| AGENT SETTING METHOD STORAGE AREA | AUTOMATIC |

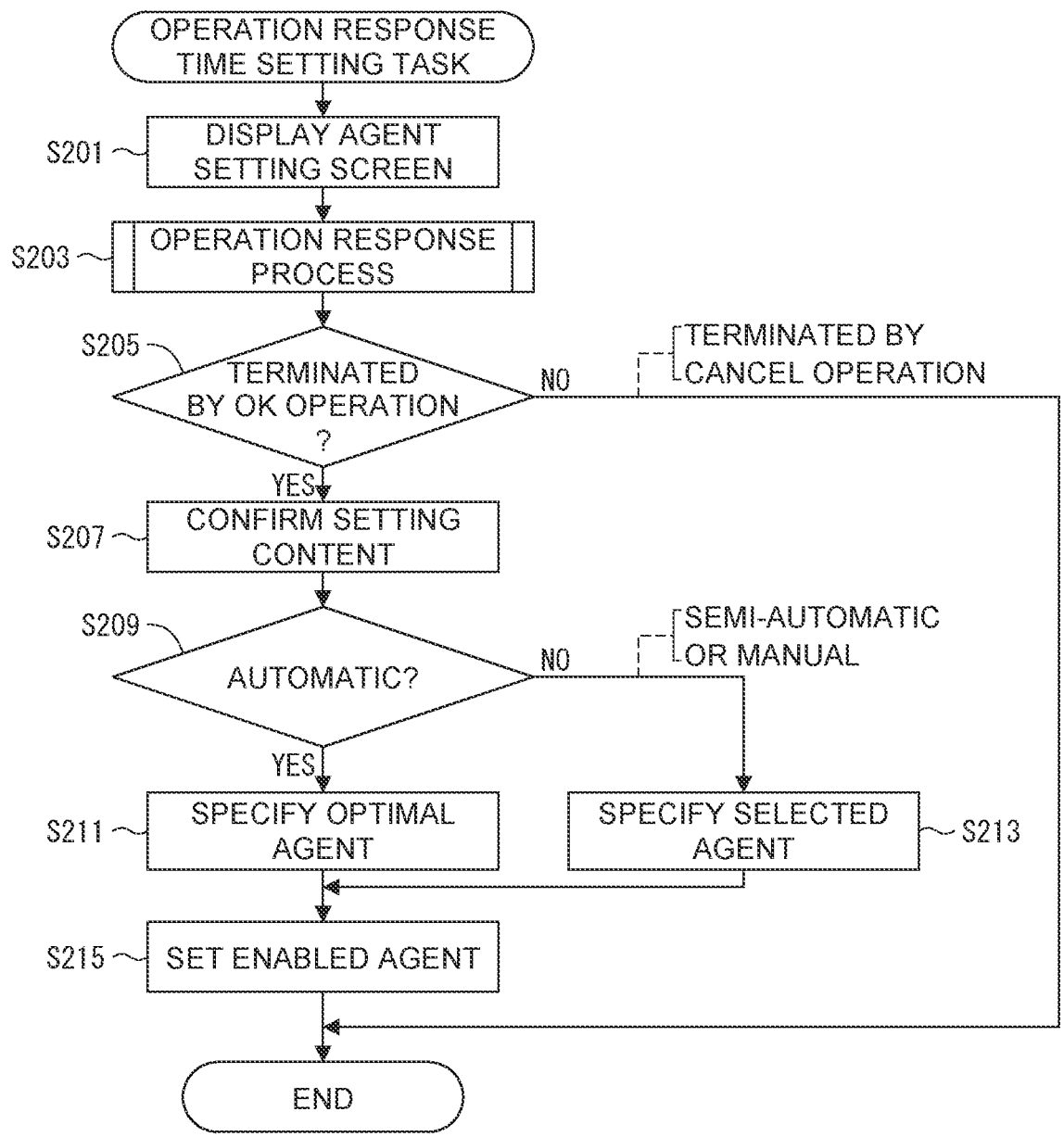

MANAGEMENT APPARATUS, MANAGEMENT SYSTEM, MANAGEMENT METHOD, AND STORAGE MEDIUM

BACKGROUND OF THE INVENTION

Field of the Invention

The present disclosure relates to a management apparatus, a management method, a management system, and a storage medium, in particular, to a management apparatus, a management method, a management system, and a storage medium to manage a plurality of electronic devices having agent functions.

Description of the Background Art

According to a conventional technique, each electronic device includes an agent. Each agent receives sending schedule information of device status information from a remote maintenance server serving as a management apparatus and acquires operation schedule information set in the electronic device including the agent from the electronic device. Then, each of the agents determines the sending timing of the device status information based on the sending schedule information and the operation schedule information and sends the device status information to the remote maintenance server in the determined sending timing.

According to the conventional technique, the device status information is sent individually from each agent to the remote maintenance server. Therefore, the larger the number of agents, i.e., the larger the number of electronic devices to be managed, the greater the network traffic. The increase in the network traffic disrupts the management of each electronic device by the management apparatus.

Therefore, the present disclosure has an object to provide a new management apparatus, management method, management system, and storage medium with which it is possible to manage each electronic device in a smooth manner while preventing an increase in the network traffic.

SUMMARY OF THE INVENTION

In order to achieve this purpose, the present disclosure includes a first disclosure for a management apparatus, a second disclosure for a management system, a third disclosure for a management method, and a fourth disclosure for a storage medium.

The first disclosure for the management apparatus is a management apparatus that manages a plurality of electronic devices having agent functions and includes an optimal agent specifier and a specification result information outputter. The optimal agent specifier specifies an optimal agent having the agent function from the plurality of electronic devices based on agent capability-related information that is acquired from each of the plurality of electronic devices and is related to, for example, the capability of the agent function of each of the plurality of electronic devices. Further, the specification result information outputter outputs specification result information indicating a specification result by the optimal agent specifier.

According to the first disclosure, a first setter may be further included. The first setter enables the agent function of the optimal agent and disables the agent function of each of the electronic devices other than the optimal agent among the plurality of electronic devices. Thus, the electronic device (optimal agent) having the agent function enabled is responsible for agent processing to acquire, from the plurality of electronic devices, the status information indicating the status of each of the plurality of electronic devices including the electronic device having the agent function enabled and send the acquired status information to the management apparatus according to the first disclosure.

According to the first disclosure, a second setter may be further included. In response to a user operation, the second setter enables the agent function of any of the plurality of electronic devices and disables the agent function of each of the electronic devices other than the electronic device having the agent function enabled among the plurality of electronic devices. In this case, too, the electronic device having the agent function enabled is responsible for the agent processing described above.

Furthermore, according to the first disclosure, a status information acquirer may be included. The status information acquirer acquires, from the electronic device having the agent function enabled, status information indicating a status of each of the plurality of electronic devices including the electronic device having the agent function enabled, i.e., collectively acquires the status information on each of the plurality of electronic devices obtained during the agent processing described above.

The agent capability-related information according to the first disclosure includes version information indicating a version of the agent function.

The agent capability-related information according to the first disclosure may include detectable number information indicating a number of the electronic devices that are detectable by the agent function among the plurality of electronic devices.

According to the first disclosure, the plurality of electronic devices is provided in a first network common to the plurality of electronic devices. In this case, the management apparatus according to the first disclosure may be provided in a second network different from the first network.

The second network here may be the Internet, for example.

The management system according to the second disclosure of the present disclosures includes the management apparatus according to the first disclosure and the plurality of electronic devices described above.

The management method according to the third disclosure of the present disclosures is a management method for managing a plurality of electronic devices having agent functions and includes an optimum agent specification step and a specification result information output step. The optimum agent specification step includes specifying an optimal agent having the agent function from the plurality of electronic devices based on agent capability-related information that is acquired from each of the plurality of electronic devices and is related to, for example, the capability of the agent function of each of the plurality of electronic devices. The specification result information output step includes outputting specification result information indicating a specification result at the optimum agent specification step.

The storage medium according to the fourth disclosure of the present disclosures is a storage medium having stored therein a management program for managing a plurality of electronic devices having agent functions and causes a computer to execute a process including an optimum agent specification step and a specification result information output step. The optimum agent specification step includes specifying an optimal agent having the agent function from the plurality of electronic devices based on agent capability-related information that is acquired from each of the plurality of electronic devices and is related to, for example, the capability of the agent function of each of the plurality of electronic devices. The specification result information output step includes outputting specification result information indicating a specification result at the optimum agent specification step.

According to the present disclosure, each electronic device may be managed in a smooth manner while an increase in the network traffic is prevented.

BRIEF DESCRIPTION OF THE DRAWINGS

FIG. 6 is a table conceptually illustrating a structure of an agent table according to an embodiment of the present disclosure.

FIG. 7 is a table conceptually illustrating a structure of an enabled agent storage area according to an embodiment of the present disclosure.

FIG. 11 is a table conceptually illustrating a structure of an agent setting method storage area according to an embodiment of the present disclosure.

FIG. 15 is a flowchart illustrating a flow of an operation response time setting task according to an embodiment of the present disclosure.

DESCRIPTION OF THE PREFERRED EMBODIMENTS

An embodiment of the present disclosure will be described by using a network system 10 for business illustrated in FIG. 1 as an example.

Figure 1:
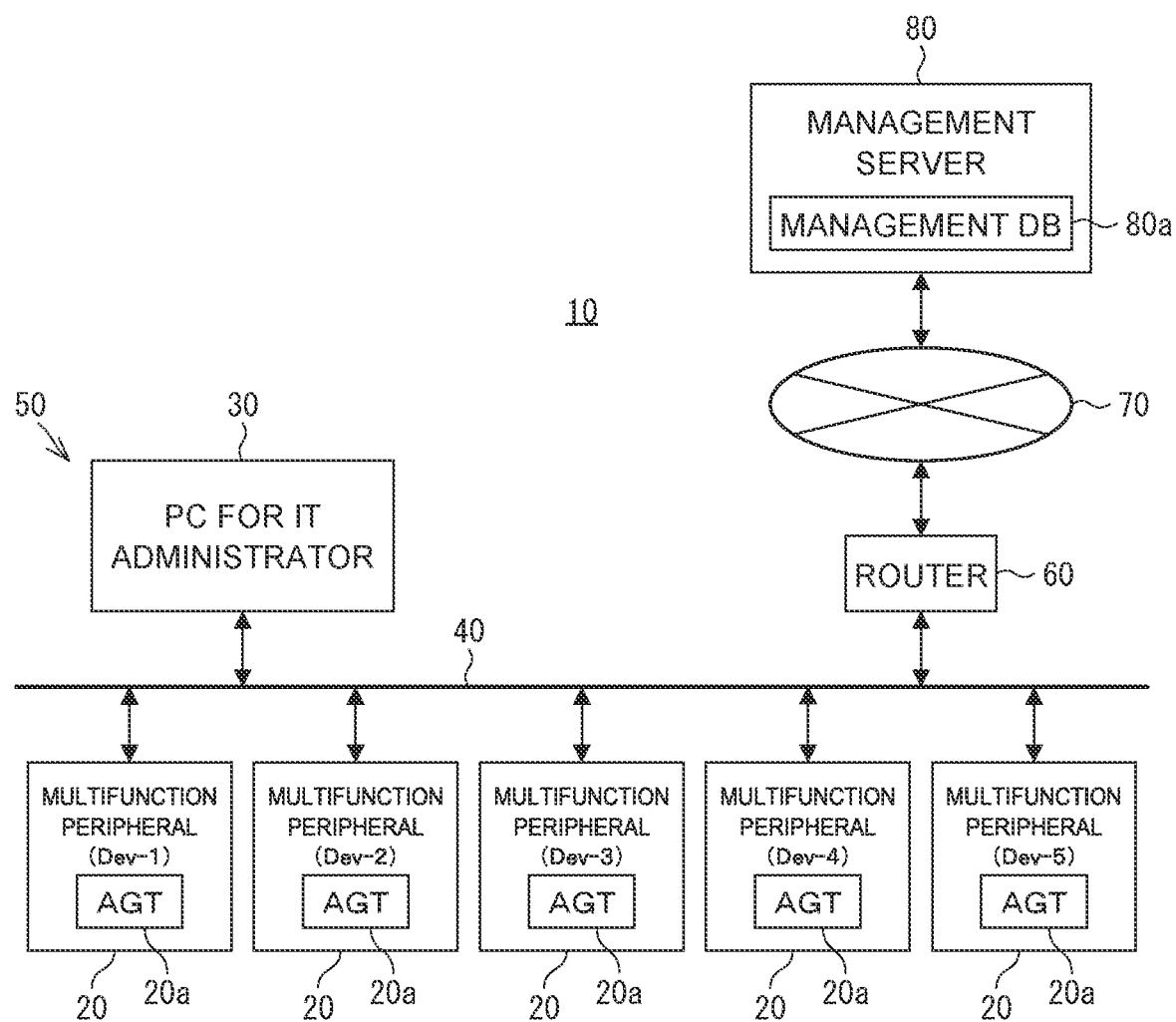
FIG. 1 is a diagram illustrating an overall configuration of a network system according to an embodiment of the present disclosure.

As illustrated in FIG. 1, the network system 10 according to the present embodiment includes a plurality of, for example, five, multifunction peripherals (MFPs) 20, 20, . . . . In addition, the network system 10 includes a personal computer (hereinafter referred to as "PC") 30 for IT administrator. Each of the multifunction peripherals 20, 20, . . . and the PC 30 are connected to a LAN line 40 serving as an internal line installed in an office to form an internal LAN 50, i.e., a closed-area communication network.

IP addresses as individual identification numbers are set for the respective multifunction peripherals 20, 20, . . . and the PC 30. In addition, arbitrary device names are assigned to the respective multifunction peripherals 20, 20, . . . and the PC 30. In particular, device names such as "Dev-1", "Dev-2", . . . are assigned to the respective multifunction peripherals 20, 20, . . . . Hereinafter, each of the multifunction peripherals 20, 20, . . . may be represented with its device name.

The LAN line 40 is connected to the Internet 70, which is a wide-area communication network, via a router 60 serving as a relay device and is further connected to a management server 80, which is one of cloud servers. The management server 80 is responsible for management of each of the multifunction peripherals 20, 20, . . . . For this purpose, the management server 80 includes a management database (DB) 80a that stores various types of information about each of the multifunction peripherals 20, 20, . . . . A URL is set for the management server 80 as the identification information for identifying the management server 80 on the Internet 70.

Each of the multifunction peripherals 20 has a plurality of functions, such as copier function, printer function, image scanner function, and fax function. In addition, each of the multifunction peripherals 20 has agent software (AGT) 20a previously installed therein (embedded agent). That is, each of the multifunction peripherals 20 has an agent function. With this agent function, each of the multifunction peripherals 20 monitors its own status, e.g., monitors a known management information base (MIB), and sends the status information indicating the monitoring result to the management server 80 in accordance with, for example, a known Simple Network Management Protocol (SNMP). This allows the management server 80 to manage each of the multifunction peripherals 20, 20, . . . , in particular remotely.

However, sending of the status information individually from each of the multifunction peripherals 20 to the management server 80 causes an increase in the network traffic. The increase in the network traffic disrupts the management of each of the multifunction peripherals 20, 20, . . . by the management server 80.

Figure 2:
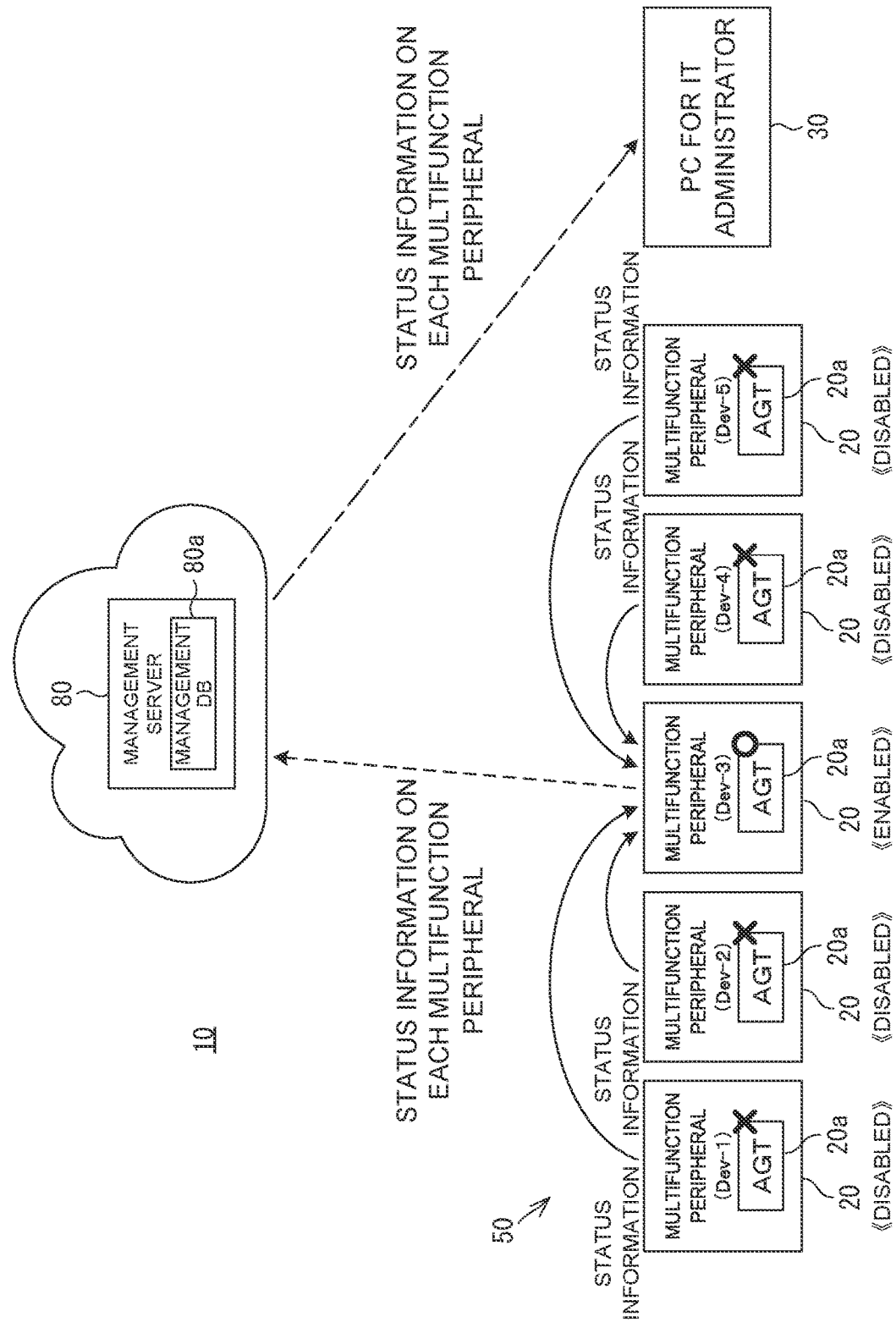
FIG. 2 is a diagram illustrating a series of operations of the network system according to an embodiment of the present disclosure.

Therefore, according to the present embodiment, as illustrated in FIG. 2, the agent function of only one of the multifunction peripherals 20, 20, . . . is enabled, and the agent functions of the other multifunction peripherals 20 are disabled. Furthermore, the multifunction peripheral 20 having the agent function enabled monitors the status of each of the multifunction peripherals 20, 20, . . . including itself, acquires the status information indicating the monitoring result, and further collectively sends the acquired pieces of status information to the management server 80. This prevents an increase in the network traffic and allows the management server 80 to manage each of the multifunction peripherals 20, 20, . . . . FIG. 2 illustrates an example where only the agent function of Dev-3 is enabled and the agent functions of the others, Dev-1, Dev-2, Dev-4, and Dev-5, are disabled. In other words, in FIG. 2, Dev-3 is a parent device, and the others, Dev-1, Dev-2, Dev-4, and Dev-5, are child devices.

The management database 80a stores the status information on each of the multifunction peripherals 20, 20, . . . sent to the management server 80. The PC 30 for IT administrator may access the management server 80 to acquire the status information on each of the multifunction peripherals 20, 20, . . . stored in the management database 80a. At that time, the PC 30 accesses the management server 80 through a web browser 306a (see FIG. 4).

Figure 3:
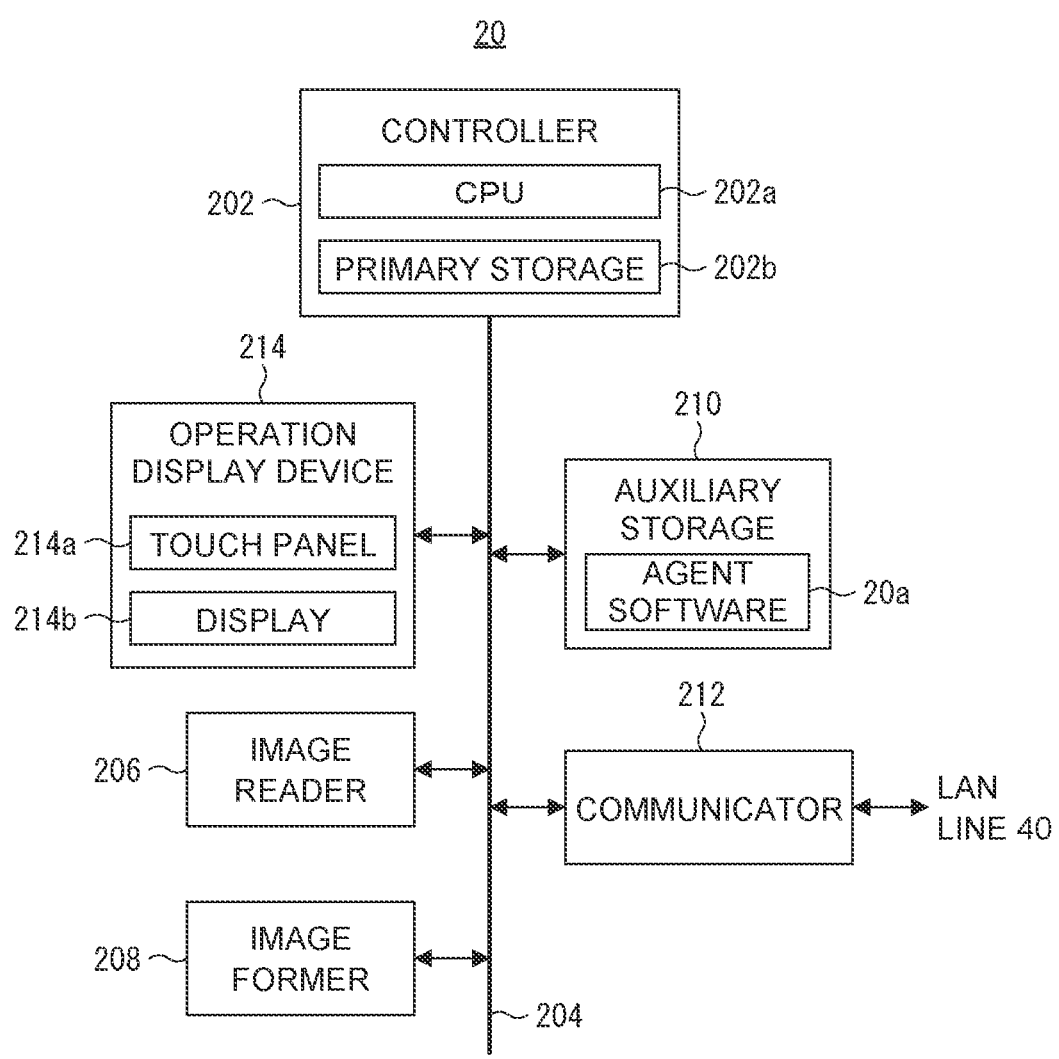
FIG. 3 is a block diagram illustrating an electrical configuration of each multifunction peripheral according to an embodiment of the present disclosure.

FIG. 3 is a block diagram illustrating an electrical configuration of each of the multifunction peripherals 20. As illustrated in FIG. 3, each of the multifunction peripherals 20 includes a controller 202. The controller 202 is coupled to an image reader 206, an image former 208, an auxiliary storage 210, a communicator 212, an operation display device 214, and the like, via a bus 204.

The controller 202 is a controller of the multifunction peripheral 20 and is responsible for the overall control of the multifunction peripheral 20. For this purpose, the controller 202 includes a CPU 202a as a control executor. In addition, the controller 202 includes a primary storage 202b as a primary storage that is directly accessible by the CPU 202a. The primary storage 202b includes a ROM and a RAM (not illustrated). The ROM stores a control program (firmware) for controlling the operation of the CPU 202a. The RAM forms a work area and a buffer area of the CPU 202a.

The image reader 206 is an image reader that is responsible for image reading processing by reading an image of a document (not illustrated) and outputting two-dimensional read image data corresponding to the image of the document. For this purpose, the image reader 206 includes a document table (not illustrated) on which a document is placed. In addition, the image reader 206 includes an image reading unit (not illustrated) including a light source, a plurality of mirrors, an imaging lens, and a line sensor and a driving mechanism (not illustrated) that moves an image reading position of the image reading unit. Furthermore, the image reader 206 includes a document press cover (not illustrated) that presses a document placed on the document table. The document press cover may include an automatic document feeder (ADF) (not illustrated) that is one of optional devices.

The image former 208 is an image former that is responsible for image forming processing by forming, i.e., printing, images based on appropriate image data, such as the above-described image reading data, on paper as a sheet-like image recording medium (not illustrated). The image forming processing is performed by, for example, a known electrophotographic method (Carlson process method). The paper having undergone the image forming processing by the image former 208, i.e., a printed matter, is discharged onto a paper discharge tray (not illustrated). The image former 208 may perform the image forming processing by using not only the electrophotographic method but also another method such as an ink jet method.

The auxiliary storage 210 is an auxiliary storage of the multifunction peripheral 20 and stores various types of data including various types of image data such as the above-described read image data as appropriate. The above-described agent software 20a is stored in, i.e., embedded in, the auxiliary storage 210. This type of auxiliary storage 210 includes, for example, a hard disk drive or an SSD.

The communicator 212 is a communicator of the multifunction peripheral 20 and is connected to the LAN line 40. The communicator 212 is responsible for two-way communication processing via the LAN line 40. The communicator 212 may be connected to the LAN line 40 by wire or wirelessly, in particular, by Wi-Fi (registered trademark).

The communicator 212 is also responsible for two-way communication processing via a public switched telephone network (not illustrated).

The operation display device 214 is what is called an operation panel and includes a touch panel 214a serving as an operation acceptor of the multifunction peripheral 20 and a display 214b serving as a display of the multifunction peripheral 20, that is, the display 214b with the touch panel 214a. The touch panel 214a is, for example, but not limited thereto, a capacitive panel. The display 214b is, for example, but not limited thereto, a liquid crystal display (LCD). In addition to the touch panel 214a, the operation display device 214 includes an appropriate hardware switch, such as a pushbutton switch (not illustrated). In addition to the display 214b, the operation display device 214 includes an appropriate light emitter, such as a light-emitting diode (LED) (not illustrated).

Figure 4:
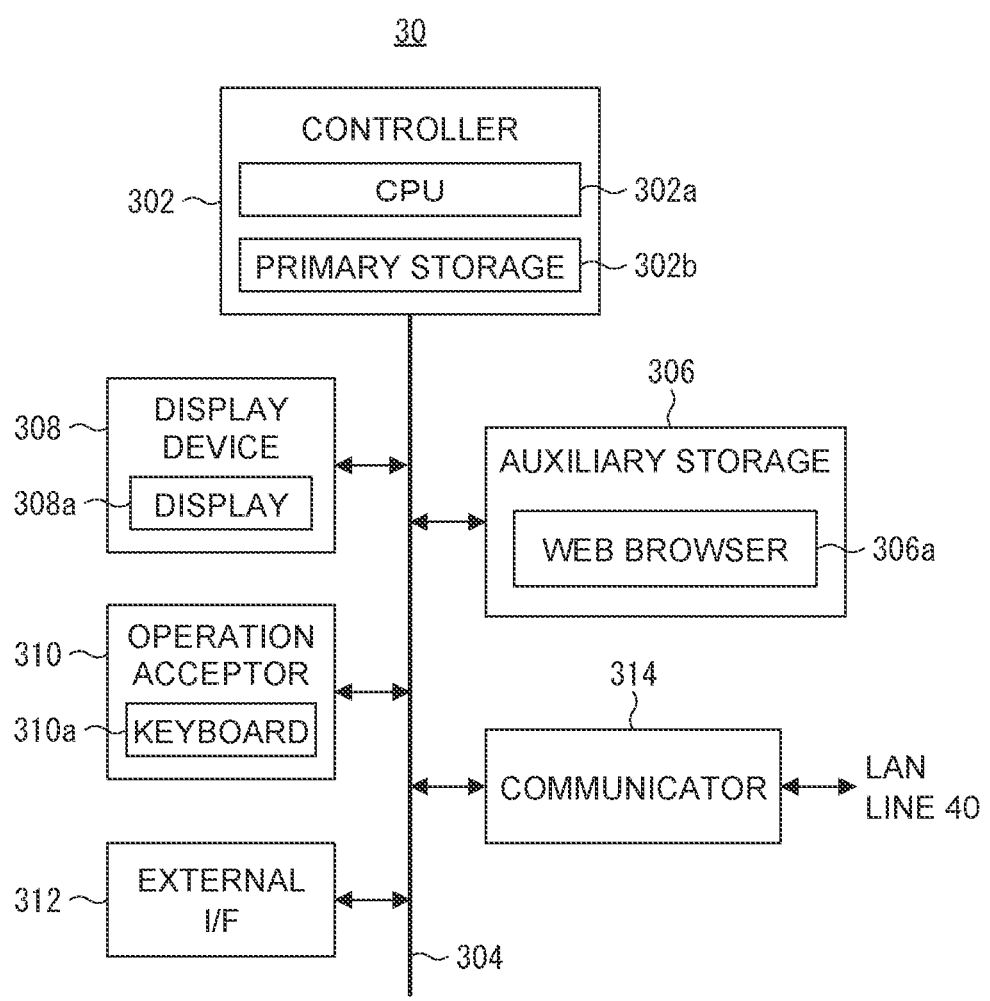
FIG. 4 is a block diagram illustrating an electrical configuration of a personal computer for IT administrator according to an embodiment of the present disclosure.

FIG. 4 is a block diagram illustrating an electrical configuration of the PC 30 for IT administrator. As illustrated in FIG. 4, the PC 30 includes a controller 302. The controller 302 is coupled to an auxiliary storage 306, a display device 308, an operation acceptor 310, an external interface (I/F) 312, a communicator 314, and the like, via a bus 304. The PC 30 may be a desktop or notebook type.

The controller 302 includes a CPU 302a serving as a control executor of the PC 30. In addition, the controller 302 includes a primary storage 302b serving as a primary storage that is directly accessible by the CPU 302a. The primary storage 302b includes a ROM and a RAM (not illustrated). The ROM stores the BIOS, and the like. The RAM forms a work area and a buffer area for the CPU 302a.

The auxiliary storage 306 is an auxiliary storage of the PC 30 and includes, for example, a hard disk drive or an SSD (not illustrated). The auxiliary storage 306 stores the operating system, various types of application software, and various types of data. The application software includes the web browser 306a.

The display device 308 includes a display 308a serving as a display of the PC 30. The display 308a is, for example, but not limited thereto, a liquid crystal display. In addition to the display 308a, the display device 308 includes an appropriate light emitter, such as a light emitting diode (not illustrated).

The operation acceptor 310 is an operation acceptor of the PC 30 and includes a keyboard 310a. In addition to the keyboard 310a, the operation acceptor 310 includes an appropriate hardware switch such as a pushbutton switch (not illustrated).

The external I/F 312 is an external interface of the PC 30 and is responsible for interface processing with an external device (not illustrated). For this purpose, the external I/F 312 includes various external connection terminals such as USB terminals (not illustrated). In particular, various USB devices such as a mouse and a USB memory (not illustrated) are connectable to the USB terminals.

The communicator 314 is a communicator of the PC 30 and is connected to the LAN line 40. The communicator 314 is responsible for two-way communication processing via the LAN line 40. The communicator 314 may be connected to the LAN line 40 by wire or by wirelessly, in particular, by Wi-Fi.

Figure 5:
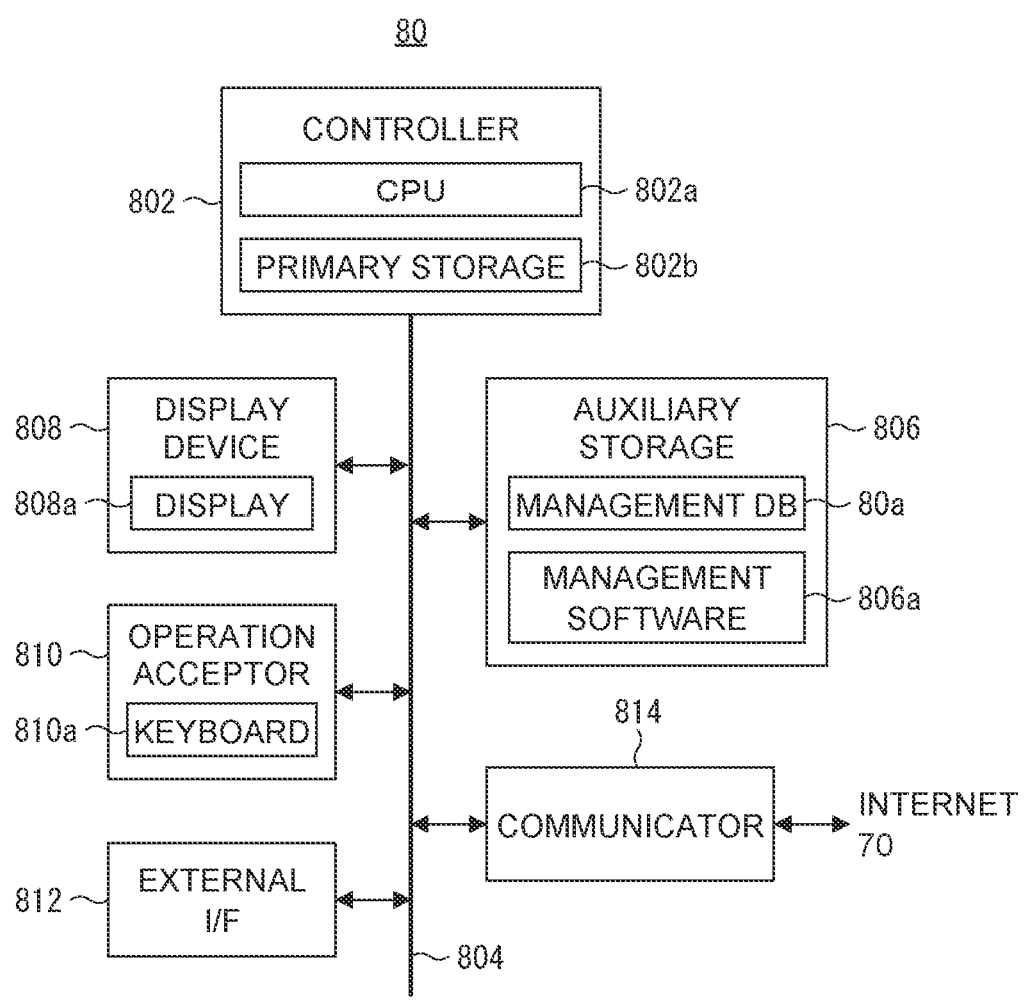
FIG. 5 is a block diagram illustrating an electrical configuration of a management server according to an embodiment of the present disclosure.

FIG. 5 is a block diagram illustrating an electrical configuration of the management server 80. As illustrated in FIG. 5, the management server 80 includes a controller 802. The controller 802 is connected to an auxiliary storage 806, a display device 808, an operation acceptor 810, an external interface (I/F) 812, a communicator 814, and the like, via a bus 804.

The controller 802 includes a CPU 802a serving as a control executor of the management server 80. In addition, the controller 802 includes a primary storage 802b serving as a primary storage that is directly accessible by the CPU 802a. The primary storage 802b includes a ROM and a RAM (not illustrated). The ROM stores the BIOS, and the like. The RAM forms a work area and a buffer area for the CPU 802a.

The auxiliary storage 806 is an auxiliary storage of the management server 80 and includes, for example, a hard disk drive or an SSD (not illustrated). The auxiliary storage 806 stores the operating system, application software, and various types of data for the server. The application software includes management software 806a. The auxiliary storage 806 includes the above-described management database 80a.

The display device 808 includes a display 808a serving as a display of the management server 80. The display 808a is, for example, but not limited thereto, a liquid crystal display. In addition to the display 808a, the display device 808 includes an appropriate light emitter such as a light emitting diode (not illustrated).

The operation acceptor 810 is an operation acceptor of the management server 80 and includes a keyboard 810a. In addition to the keyboard 810a, the operation acceptor 810 includes an appropriate hardware switch such as a pushbutton switch (not illustrated).

The external I/F 812 is an external interface of the management server 80 and is responsible for interface processing with an external device (not illustrated). For this purpose, the external I/F 812 includes various external connection terminals such as USB terminals (not illustrated). In particular, various USB devices such as a mouse (not illustrated) are connectable to the USB terminals.

The communicator 814 is a communicator of the management server 80 and is connected to the Internet 70 via a relay device (not illustrated) or the like.

As described above, according to the present embodiment, the agent function is enabled for only one of the multifunction peripherals 20, 20, . . . . Three setting methods are available for enabling the agent function of any of the multifunction peripherals 20: automatic, semi-automatic, and manual.

According to the automatic setting method of the above, the multifunction peripheral 20 having the agent function that is expected to contribute to the smoothest management among the multifunction peripherals 20, 20, . . . , i.e., has the highest capability, is specified as an optimal agent, and the agent function of the optimal agent is enabled. According to the semi-automatic setting method, the optimal agent is presented as a recommended agent to the IT administrator, while the agent function of any of the multifunction peripherals 20 to be enabled is arbitrarily set by a manual operation of the IT administrator. Furthermore, according to the manual setting method, the agent function of any of the multifunction peripherals 20 to be enabled is arbitrarily set by a manual operation of the IT administrator. The agent setting method to be used among the automatic setting method, the semi-automatic setting method, and the manual setting method is also arbitrarily selected by a manual operation of the IT administrator.

Specifically, first, a registration operation is performed to register each of the multifunction peripherals 20 in the management server 80. The registration operation is preferably performed at the time of installation of each of the multifunction peripherals 20, but not limited thereto, and may be performed at any time. When the registration operation is performed, the multifunction peripheral 20, which has accepted the registration operation, i.e., the multifunction peripheral 20 that is the target for registration, conducts search to determine the multifunction peripherals 20 constituting the internal LAN 50 (that is, connected to the LAN line 40) including itself or, in other words, searches for devices. Then, the multifunction peripheral 20 to be registered sends, to the management server 80, the registration information including the result of the device search and, in particular, the detection device number indicating the number of the multifunction peripherals 20 detected during the device search. The registration information here includes the IP address of the multifunction peripheral 20 to be registered, the version of the agent function, and the device name in addition to the detection device number.

The registration information received by the management server 80 is stored in an agent table 850 illustrated in FIG. 6. Accordingly, the multifunction peripheral 20 to be registered is registered in the management server 80. The agent table 850 is configured by the management software 806a and is included in the auxiliary storage 806. FIG. 6 illustrates an example of the agent table 850 when all the multifunction peripherals 20, 20, . . . constituting the internal LAN 50 are registered.

Furthermore, among the multifunction peripherals 20, 20, . . . registered in the management server 80, the multifunction peripheral 20 having the latest version and the largest detection device number is specified as an optimal agent. In the example illustrated in FIG. 6, Dev-3 is specified as the optimal agent.

Here, for example, when the automatic setting method is selected as the agent setting method, the agent function of the optimal agent is enabled, as described above. Then, the agent functions of the multifunction peripherals 20 other than the optimal agent are disabled.

In the automatic setting method, when there are the multifunction peripherals 20 that satisfy the conditions as the optimal agent, for example, the multifunction peripheral 20 registered at the latest (newest) time among them is specified as the optimal agent. Contrary to this, the multifunction peripheral 20 registered at the earliest (oldest) time may be specified as the optimal agent. When the multifunction peripheral 20 that satisfies the conditions as the optimal agent is not present, for example, priority is given to the detection device number, that is, the multifunction peripheral 20 having the largest detection device number and the latest version among them is specified as the optimal agent. Contrary to this, priority may be given to the version, that is, the multifunction peripheral 20 having the latest version and the largest detection device number among them may be specified as the optimal agent.

Figure 7:
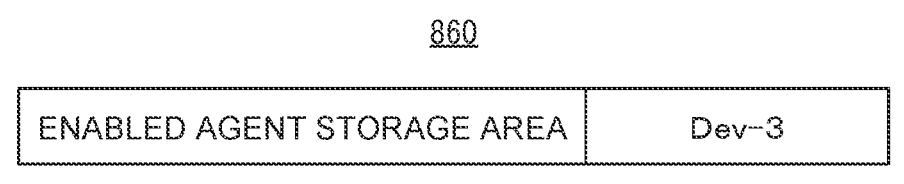

When the agent function of the optimal agent is enabled, strictly speaking, when the agent function of any of the multifunction peripherals 20 is enabled, that information is stored in an enabled agent storage area 860 illustrated in FIG. 7. The enabled agent storage area 860 is also configured by the management software 806a and is included in the auxiliary storage 806. FIG. 7 illustrates an example where the agent function of Dev-3 is enabled.

The content of the agent table 850 may be checked by the PC 30 for IT administrator. Specifically, when the web browser 306a of the PC 30 is used to access the management server 80 and a predetermined operation is performed on the web browser 306a, the display 308a of the PC 30 presents an agent setting screen 350 illustrated in FIG. 8.

In an upper portion of the agent setting screen 350, a drop-down list 352 is provided to select the agent setting method. Then, an agent list 354 is provided under the drop-down list 352 based on the content of the agent table 850. Furthermore, an "OK" key 356 and a "cancel" key 358 are provided under the agent list 354, in other words, in a lower portion of the agent setting screen 350.

Figure 8:
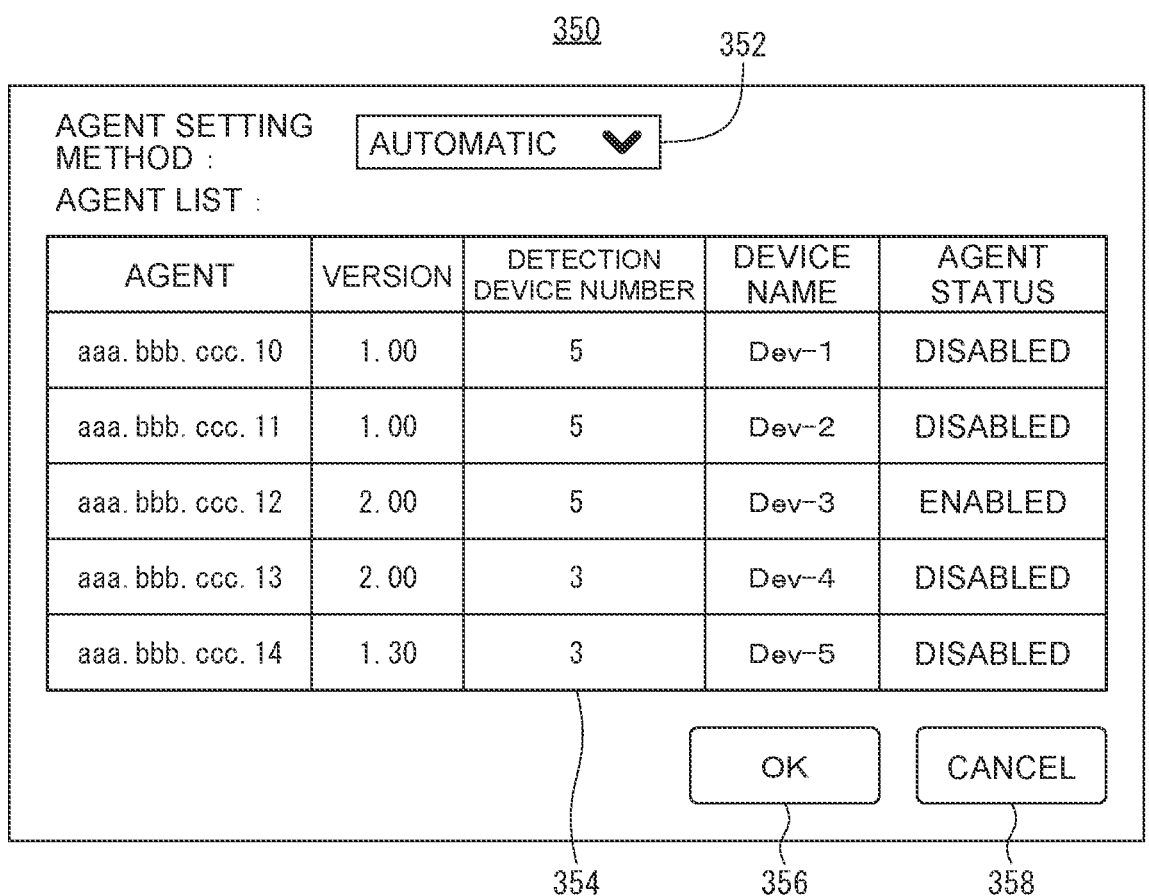
FIG. 8 is a diagram illustrating an example of an agent setting screen according to an embodiment of the present disclosure.

When the "OK" key 356, for example, is operated (pressed) on the agent setting screen 350 illustrated in FIG. 8, the setting content on the agent setting screen 350 is confirmed. Conversely, when the "cancel" key 358 is operated, the state immediately before the agent setting screen 350 is displayed is maintained.

Figure 9:
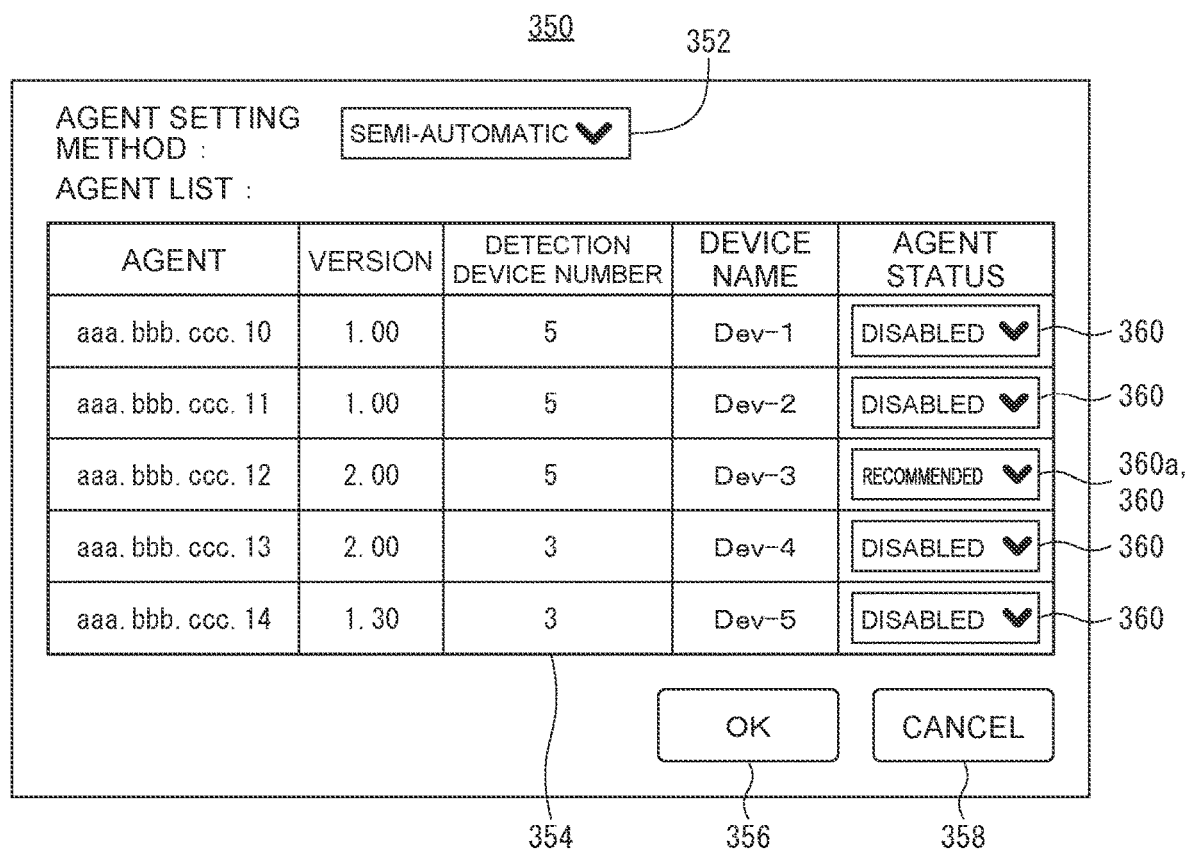
FIG. 9 is a diagram illustrating another example of the agent setting screen according to an embodiment of the present disclosure.

For example, when the semi-automatic setting method is selected as the agent setting method, the optimal agent is presented as a recommended agent to the IT administrator, while the agent function of any of the multifunction peripherals 20 to be enabled is arbitrarily set by a manual operation of the IT administrator, as described above. Specifically, as illustrated in FIG. 9, agent status columns in the agent list 354 of the agent setting screen 350 are displayed by drop-down lists 360. In particular, a drop-down list 360a for the optimal agent includes the character string "recommended" indicating that the optimal agent is a recommended agent. Either "enabled" or "disabled" may be arbitrarily set by an operation of each of the drop-down lists 360.

In the semi-automatic setting method, when there are the multifunction peripherals 20 that satisfy the conditions as the optimal agent, all the optimal agents are presented as recommended agents. When the multifunction peripheral 20 that satisfies the conditions as the optimal agent is not present, for example, priority is given to the detection device number, that is, the multifunction peripheral 20 having the largest detection device number and the latest version among them is specified as the optimal agent. Contrary to this, priority may be given to the version, that is, the multifunction peripheral 20 having the latest version and the largest detection device number among them may be specified as the optimal agent.

On the agent setting screen 350 illustrated in FIG. 9, the agent function of any of the multifunction peripherals 20, 20, . . . including the recommended agent needs to be enabled, while the agent functions of the other multifunction peripherals 20 need to be disabled. In other words, at least the "OK" key 356 is not accepted for operation and, for example, is grayed out unless the agent function of any of the multifunction peripherals 20, 20, . . . is enabled and the agent functions of the other multifunction peripherals 20 are disabled. The setting content on the agent setting screen 350 is confirmed when the "OK" key 356 is operated after the agent function of any of the multifunction peripherals 20, 20, . . . is enabled and the agent functions of the other multifunction peripherals 20 are disabled. Conversely, when the "cancel" key 358 is operated, the state immediately before the agent setting screen 350 is displayed is maintained.

Figure 10:
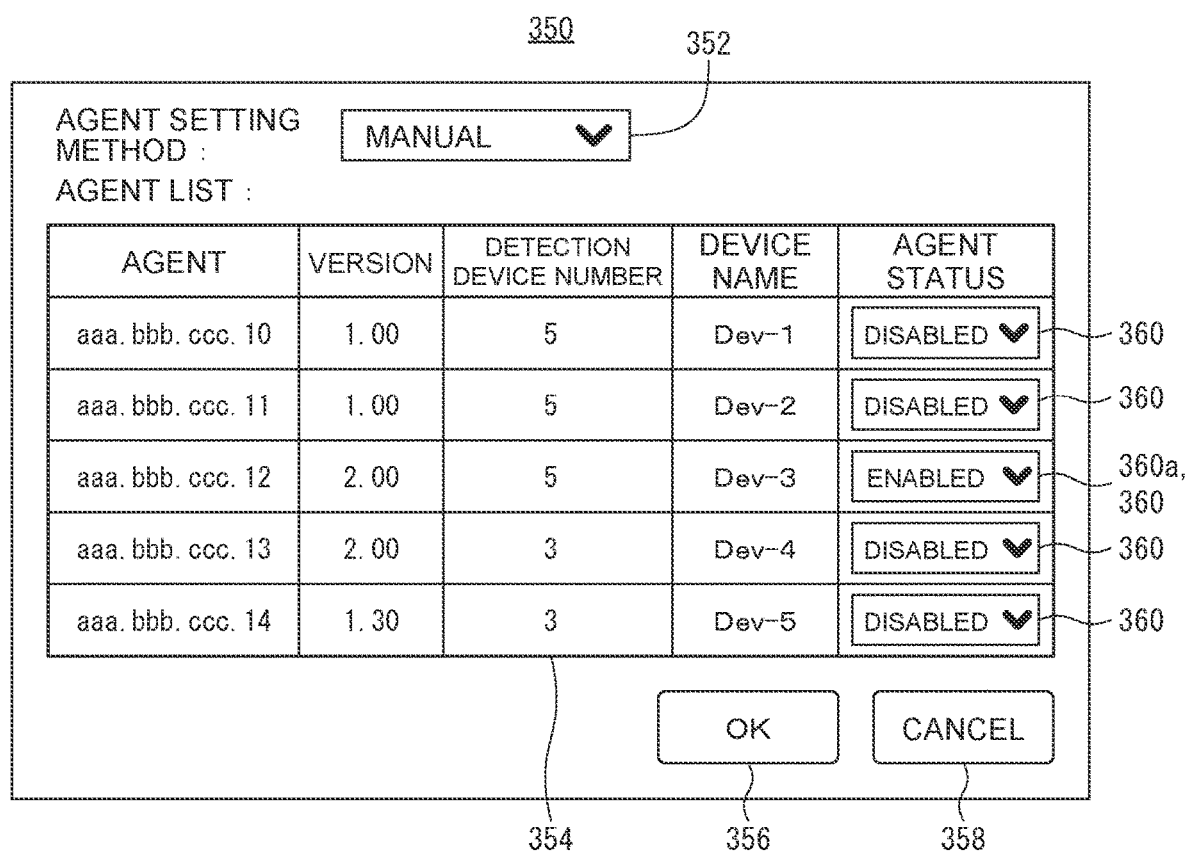
FIG. 10 is a diagram illustrating further another example of the agent setting screen according to an embodiment of the present disclosure.

Furthermore, when the manual setting method is selected as the agent setting method, the agent function of any of the multifunction peripherals 20 to be enabled is arbitrarily set by a manual operation of the IT administrator, as described above. Specifically, as illustrated in FIG. 10, the agent status columns in the agent list 354 of the agent setting screen 350 are displayed by the drop-down lists 360. Either "enabled" or "disabled" may be arbitrarily set by an operation of each of the drop-down lists 360.

In the agent setting screen 350 illustrated in FIG. 10, too, the agent function of any of the multifunction peripherals 20, 20, . . . needs to be enabled, and the agent functions of the other multifunction peripherals 20 need to be disabled. In other words, at least the "OK" key 356 is not accepted for operation and, for example, is grayed out unless the agent function of any of the multifunction peripherals 20, 20, . . . is enabled and the agent functions of the other multifunction peripherals 20 are disabled. The setting content on the agent setting screen 350 is confirmed when the "OK" key 356 is operated after the agent function of any of the multifunction peripherals 20, 20, . . . is enabled and the agent functions of the other multifunction peripherals 20 are disabled. Conversely, when the "cancel" key 358 is operated, the state immediately before the agent setting screen 350 is displayed is maintained. The agent setting method to be used among the automatic setting method, the semi-automatic setting method, and the manual setting method is also arbitrarily selected by a manual operation of the IT administrator.

An agent setting method storage area 870 illustrated in FIG. 11 stores the agent setting method. The agent setting method storage area 870 is also configured by the management software 806a and is included in the auxiliary storage 806. FIG. 11 illustrates an example where the automatic setting method is selected as the agent setting method.

Figure 12:
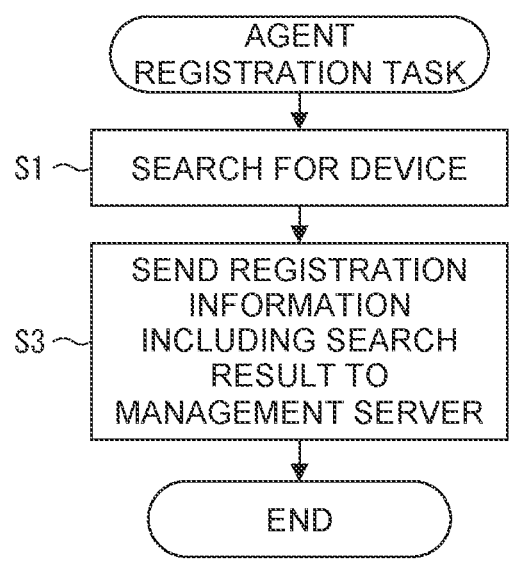
FIG. 12 is a flowchart illustrating a flow of an agent registration task according to an embodiment of the present disclosure.

According to the present embodiment, when the registration operation is performed to register each of the multifunction peripherals 20 in the management server 80, the CPU 202a of the multifunction peripheral 20 performs an agent registration task in accordance with an agent registration program included in the agent software 20a. FIG. 12 illustrates a flow of the agent registration task. The agent registration task is performed in response to the registration operation.

According to the agent registration task, the CPU 202a first performs the device search in Step S1, that is, conducts search to determine the multifunction peripherals 20 constituting the internal LAN 50 including the multifunction peripheral 20 (own device) on which it is mounted. Then, the CPU 202a proceeds to the process in Step S3.

In Step S3, the CPU 202a sends, to the management server 80, the registration information including the result of the device search in Step S1, in particular, the detection device number. As described above, the registration information includes the IP address, the version of the agent function, and the device name of the multifunction peripheral 20 to be registered in addition to the detection device number. After Step S3 is performed, the CPU 202a terminates the agent registration task.

Although detailed descriptions as well as illustrations are omitted, it is also possible to cancel the registration of the registered multifunction peripheral 20. In this case, the CPU 202a performs an agent registration cancellation task. The agent registration cancellation task may be performed at any time. When the agent registration cancellation task is performed, registration cancellation information is sent to the management server 80 from the multifunction peripheral 20, which is the target for registration cancellation. In response to this, the management server 80 cancels the registration of the multifunction peripheral 20, which is the target for registration cancellation, that is, deletes the registration information about the multifunction peripheral 20 from the agent table 850.

Figure 13:
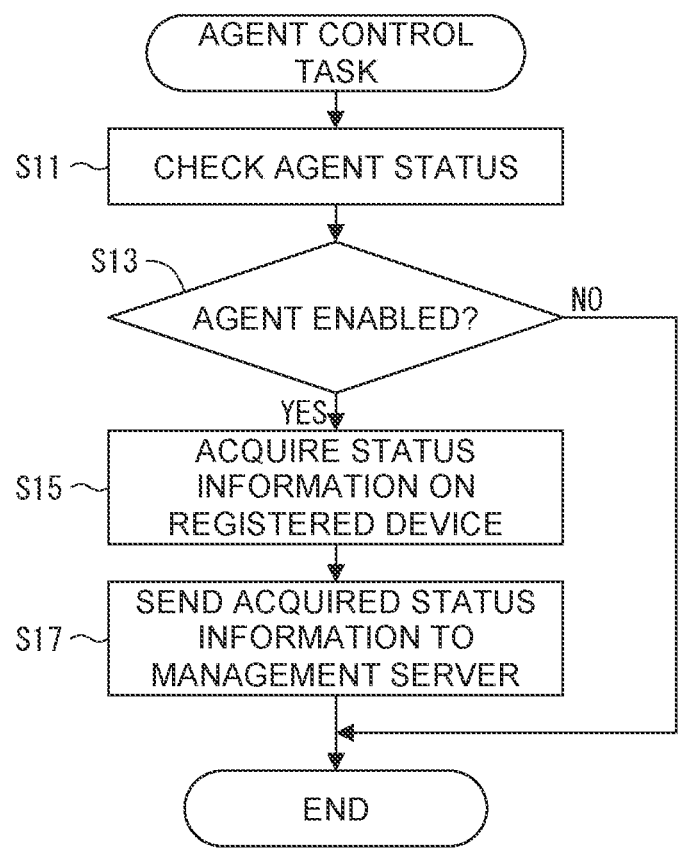
FIG. 13 is a flowchart illustrating a flow of an agent control task according to an embodiment of the present disclosure.

The CPU 202a of each of the multifunction peripherals 20 performs an agent control task in accordance with an agent control program included in the agent software 20a. FIG. 13 illustrates a flow of the agent control task. The agent control task is performed in accordance with schedule information provided by the management server 80, for example on a regular basis, specifically every few hours. The agent control task is also performed by what is called interrupt when some event such as paper jam or paper shortage occurs in any of the multifunction peripherals 20. The interrupt when some event occurs is performed by SNMP trap.

According to the agent control task, first in Step S11, the CPU 202a accesses the management server 80, in particular, refers to the enabled agent storage area 860 to check whether the agent function of itself (the multifunction peripheral 20 on which it is mounted) is enabled, strictly speaking, such settings are made. Then, the CPU 202a proceeds to the process in Step S13.

In Step S13, the CPU 202a determines whether the agent function of itself (the multifunction peripheral 20 on which it is mounted) is enabled as a result of the checking in Step S11. Here, for example, when the agent function of its own is not enabled, the CPU 202a terminates the agent control task. Conversely, when the agent function of its own is enabled, the CPU 202a proceeds to the process in Step S15.

In Step S15, the CPU 202a monitors the status of each of the registered multifunction peripherals 20 (registered devices) including itself (the multifunction peripheral 20 on which it is mounted) and acquires the status information indicating the monitoring result. Then, the CPU 202a proceeds to the process in Step S17.

In Step S17, the CPU 202a collectively sends each piece of status information acquired in Step S15 to the management server 80. After Step S17 is performed, the CPU 202a terminates the agent control task.

That is, the agent control task is performed by all the registered multifunction peripherals 20, 20, . . . , but the agent processing, which is the essential processing of the agent function in Steps S15 and S17, is performed only by the multifunction peripheral 20 (the CPU 202a thereof) having the agent function enabled.

Figure 14:
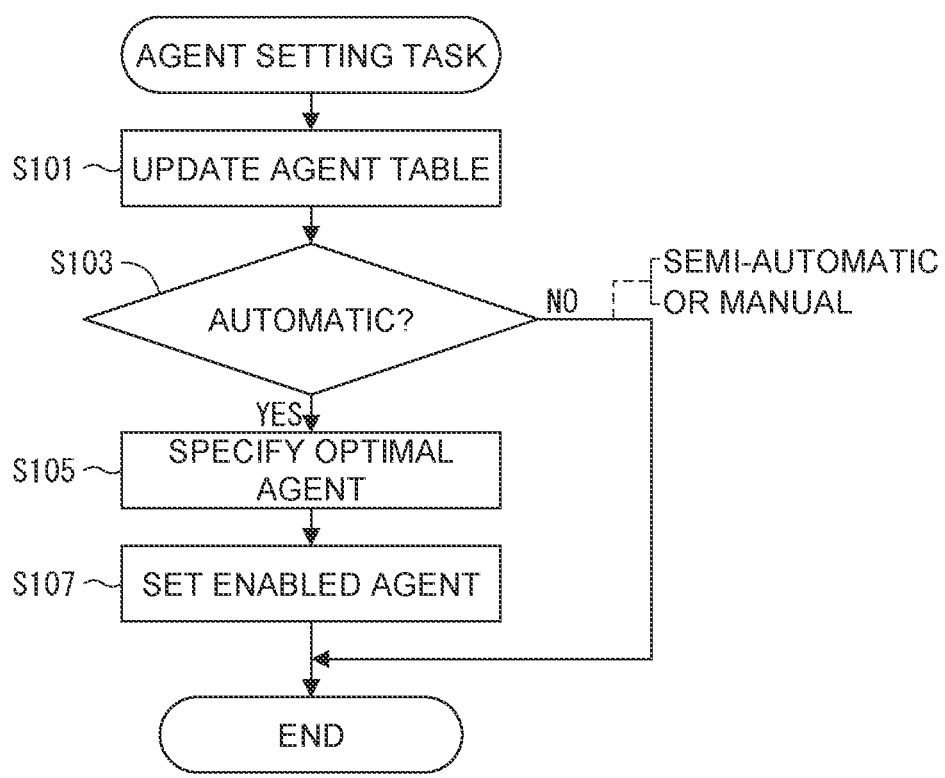
FIG. 14 is a flowchart illustrating a flow of an agent setting task according to an embodiment of the present disclosure.

In contrast, when the CPU 802a of the management server 80 receives the above-described registration information or registration cancellation information from any of the multifunction peripherals 20, the CPU 802a accordingly performs an agent setting task. FIG. 14 illustrates a flow of the agent setting task. The CPU 802a of the management server 80 performs the agent setting task in accordance with the agent setting program included in the management software 806a.

According to the agent setting task, the CPU 802a first updates the agent table 850 in Step S101. Specifically, when the registration information is received from any of the multifunction peripherals 20, the CPU 802a stores the registration information in the agent table 850. When the registration cancellation information is received from any of the multifunction peripherals 20, the CPU 802a deletes the registration information on the multifunction peripheral 20, which is the target for registration cancellation, from the agent table 850 based on the registration cancellation information. Then, the CPU 802a proceeds to the process in Step S103.

In Step S103, the CPU 802a refers to the agent setting method storage area 870 to determine whether the automatic setting method is selected as the agent setting method. Here, for example, when the automatic setting method is not selected as the agent setting method, that is, when the semi-automatic setting method or the manual setting method is selected as the agent setting method, the CPU 802a terminates the agent setting task. Conversely, when the automatic setting method is selected as the agent setting method, the CPU 802a proceeds to the process in Step S105.

In Step S105, the CPU 802a specifies the optimal agent in the manner described above. Then, the CPU 802a proceeds to the process in Step S107.

In Step S107, the CPU 802a enables the agent function of the multifunction peripheral 20 specified as the optimal agent in Step S105, i.e., set the enabled agent, that is, stores that information in the enabled agent storage area 860. Accordingly, the CPU 802a terminates the agent setting task.

Also, the CPU 802a of the management server 80 performs an operation response time setting task in response to a request from the PC 30 for IT administrator to display the agent setting screen 350. FIG. 15 illustrates a flow of the operation response time setting task. The CPU 802a of the management server 80 performs the response operation time setting task in accordance with a response operation time setting program included in the management software 806a.

According to the response operation time setting task, the CPU 802a first displays the agent setting screen 350 on the display 308a of the PC 30 for IT administrator in Step S201. Then, the CPU 802a proceeds to the process in Step S203.

In Step S203, the CPU 802a performs the process corresponding to an operation on the agent setting screen 350. Specifically, the CPU 802a selects the agent setting method, i.e., the automatic setting method, the semi-automatic setting method, or the manual setting method, in response to the operation on the drop-down list 352 in the agent setting screen 350. Alternatively, the CPU 802a enables and disables the agent function of each of the multifunction peripherals 20 in response to an operation on the different drop-down list 360 on the agent setting screen 350. When either the "OK" key 356 or the "cancel" key 358 on the agent setting screen 350 is operated, the CPU 802a terminates the operation response process in Step S203 and proceeds to the process in Step S205.

In Step S205, the CPU 802a determines whether the operation response process in Step S203 has been terminated by the operation on the "OK" key 356 in the agent setting screen 350. Here, for example, when the operation response process in Step S203 has been terminated because the "cancel" key 358 was pressed instead of the operation on the "OK" key 356 in the agent setting screen 350, the CPU 802a terminates the operation response time setting task. Conversely, when the operation response process in Step S203 has been terminated by the operation on the "OK" key 356, the CPU 802a proceeds to the process in Step S207.

In Step S207, the CPU 802a confirms the setting content on the agent setting screen 350. Then, the CPU 802a proceeds to the process in Step S209.

In Step S209, the CPU 802a refers to the agent setting method storage area 870 to determine whether the automatic setting method is selected as the agent setting method. Here, for example, when the automatic setting method is selected as the agent setting method, the CPU 802a proceeds to the process in Step S211. Conversely, when the automatic setting method is not selected as the agent setting method, that is, when the semi-automatic setting method or the manual setting method is selected as the agent setting method, the CPU 802a proceeds to the process in Step S213 described below.

In Step S211, the CPU 802a specifies the optimal agent. Then, the CPU 802a proceeds to the process in Step S215 described below.

When the process proceeds from Step S209 to Step S213, the CPU 802a specifies the multifunction peripheral 20 selected to enable the agent function, i.e., the selected agent, in Step S213. Then, the CPU 802a proceeds to the process in Step S215.

In Step S215, the CPU 802a enables the agent function of the multifunction peripheral 20 specified as the optimal agent in Step S211 or enables the agent function of the multifunction peripheral 20 specified as the selected agent in Step S213. Specifically, the CPU 802a sets the enabled agent, that is, stores that information in the enabled agent storage area 860. Accordingly, the CPU 802a terminates the operation response time setting task.

As described above, according to the present embodiment, it is possible to set the multifunction peripheral 20 whose agent function is enabled by using the three agent setting methods: the automatic setting method, the semi-automatic setting method, and the manual setting method. In particular, according to the automatic setting method, the multifunction peripheral 20 having the agent function with the highest capability is specified as the optimal agent, and the agent function of the optimal agent is enabled. Thus, each of the multifunction peripherals 20, 20, . . . may be managed in a smooth manner while an increase in the network traffic is prevented.

The multifunction peripheral 20 according to the present embodiment is an example of an electronic device according to the present disclosure. The management server 80 according to the present embodiment is an example of a management apparatus according to the present disclosure. Furthermore, the network system 10 according to the present embodiment is an example of a management system according to the present disclosure.

In addition, the internal LAN 50 according to the present embodiment is an example of a first network according to the present disclosure. The Internet 70 according to the present embodiment is an example of a second network according to the present disclosure. The status information on each of the multifunction peripherals 20, 20, . . . , which is collectively sent from the multifunction peripheral 20 having the agent function enabled to the management server 80 is received by the management server 80 and is acquired by the CPU 802a of the management server 80, and the CPU 802a is an example of a status information acquirer according to the present disclosure.

Furthermore, the CPU 802a of the management server 80 that performs Step S105 in the agent setting task and Step S211 in the operation response time setting task according to the present embodiment is an example of an optimal agent specifier according to the present disclosure. The CPU 802a of the management server 80 that performs Step S201 in the operation response time setting task is an example of a specification result information outputter according to the present disclosure. In particular, the agent setting screen 350 illustrated in FIG. 8 is an example of specification result information according to the present disclosure.

The CPU 802a of the management server 80 that performs Step S107 in the agent setting task is an example of a first setter according to the present disclosure. The CPU 802a of the management server 80 that performs Step S215 in the operation response time setting task, strictly speaking, the CPU 802a that performs Step S215 after Step S211 is an example of the first setter according to the present disclosure. The CPU 802a that performs Step S215 after Step S213 is an example of a second setter according to the present disclosure.

The present embodiment is one specific example of the present disclosure and does not limit the technical scope of the present disclosure. Specifically, the present disclosure may be applied to aspects other than the present embodiment.

For example, one agent is selected as the optimal agent, but a configuration may be such that a sub agent is selected in addition to a main agent.

The present disclosure may also be applied to an aspect of managing an electronic device other than the multifunction peripheral 20.

Instead of or in addition to the PC 30 for IT administrator, a portable terminal device such as a tablet or a smartphone may be employed.

Furthermore, the management server 80 may be provided in the internal LAN 50, or the same function as that of the management server 80 may be provided in the PC 30 for IT administrator. In addition, the same function as that of the management server 80 may be provided in any of the multifunction peripherals 20.

The present disclosure is not limited to the form of an apparatus such as a management apparatus (electronic device management apparatus) or the form of a system such as a management system (electronic device management system), but may also be provided in the form of a method such as a management method (electronic device management method) or the form of a program such as a management program (electronic device management program).

Furthermore, the present disclosure may also be provided in the form of a non-transitory computer-readable storage medium storing the management program. The storage media here include disc-type media such as CDs and DVDs, or semiconductor-type media such as USB memories and SD memory cards. Device-embedded (built-in) media such as ROMs and hard disk drives may also be applied as the storage media here instead of portable media.

What is claimed is:

1. A management apparatus that manages a plurality of electronic devices having agent functions, the management apparatus comprising:
   an optimal agent specifier that specifies an optimal agent function of an electronic device from the plurality of electronic devices based on information that is acquired from each of the plurality of electronic devices and that is related to a corresponding agent function of each of the plurality of electronic devices;
   a setter that enables the optimal agent function of the electronic device and disables the corresponding agent function of each of other electronic devices in the plurality of electronic devices;
   a status information acquirer that acquires, via the electronic device with the optimal agent function enabled, status information indicating a status of the electronic device having the optimal agent function enabled and status information indicating a status of each of the other electronic devices having the corresponding agent function disabled; and
   a specification result information outputter that outputs specification result information indicating a specification result by the optimal agent specifier,
   wherein registration information including a number of electronic devices of the plurality of electronic devices that are detectable by the corresponding agent function of each of the electronic devices having accepted a registration operation acquired from electronic devices of the plurality of electronic devices that have accepted the registration operation.

2. The management apparatus according to claim 1, wherein the information includes version information indicating a version of each corresponding agent function.

3. The management apparatus according to claim 1, wherein
   the plurality of electronic devices is provided in a first network common to the plurality of electronic devices, and the management apparatus is provided in a second network different from the first network.

4. The management apparatus according to claim 3, wherein the second network is the Internet.

5. A management system comprising:
the management apparatus according to claim 1; and
the plurality of electronic devices.

6. The management apparatus according to claim 1, wherein the information includes detectable number information indicating the number of electronic devices of the plurality of electronic devices that are detectable by the corresponding agent functions of the electronic devices.

7. The management apparatus according to claim 1, wherein the optimal agent specifier specifies the optimal agent function based on information related to the corresponding agent functions included in the registration information.

8. A management method for managing a plurality of electronic devices having agent functions, the management method comprising:
specifying an optimal agent function of an electronic device from the plurality of electronic devices based on information that is acquired from each of the plurality of electronic devices and that is related to a corresponding agent function of each of the plurality of electronic devices;
setting to enable the optimal agent function of the electronic device and disable the corresponding agent function of each of other electronic devices in the plurality of electronic devices;
acquiring, via the electronic device with the optimal agent function enabled, status information indicating a status of the electronic device having the optimal agent function enabled and status information indicating a status of each of the other electronic devices having the corresponding agent function disabled; and
outputting specification result information indicating a specification result,
wherein registration information including a number of electronic devices of the plurality of electronic devices that are detectable by the corresponding agent function of each of the electronic devices having accepted a registration operation acquired from electronic devices of the plurality of electronic devices that have accepted the registration operation.

9. A non-transitory computer-readable storage medium storing a management program for managing a plurality of electronic devices having agent functions, the management program, when executed by at least one processor, causing a computer to:
specify an optimal agent function of an electronic device from the plurality of electronic devices based on information that is acquired from each of the plurality of electronic devices and that is related to a corresponding agent function of each of the plurality of electronic devices;
set to enable the optimal agent function of the electronic device and disable the corresponding agent function of each of other electronic devices in the plurality of electronic devices;
acquire, via the electronic device with the optimal agent function enabled, status information indicating a status of the electronic device having the optimal agent function enabled and status information indicating a status of each of the other electronic devices having the corresponding agent function disabled; and
output specification result information indicating a specification result,
wherein registration information including a number of electronic devices of the plurality of electronic devices that are detectable by the corresponding agent function of each of the electronic devices having accepted a registration operation acquired from electronic devices of the plurality of electronic devices that have accepted the registration operation.

10. A management apparatus according to claim 1, that manages a plurality of electronic devices having agent functions, the management apparatus comprising:
an optimal agent specifier that specifies an optimal agent function of an electronic device from the plurality of electronic devices based on information that is acquired from each of the plurality of electronic devices and that is related to a corresponding agent function of each of the plurality of electronic devices;
a setter that enables the optimal agent function of the electronic device and disables the corresponding agent function of each of other electronic devices in the plurality of electronic devices;
a status information acquirer that acquires, via the electronic device with the optimal agent function enabled, status information indicating a status of the electronic device having the optimal agent function enabled and status information indicating a status of each of the other electronic devices having the corresponding agent function disabled; and
a specification result information outputter that outputs specification result information indicating a specification result by the optimal agent specifier,
wherein each of the plurality of electronic devices is registered, and
the optimal agent specifier specifies the optimal agent function based on a registration order of the plurality of electronic devices that satisfies conditions as the optimal agent function when there are a plurality of electronic devices that satisfy the conditions as the optimal agent function.

11. The management apparatus according to claim 10, wherein the information includes version information indicating a version of each corresponding agent function.

12. The management apparatus according to claim 10, wherein
the plurality of electronic devices is provided in a first network common to the plurality of electronic devices, and
the management apparatus is provided in a second network different from the first network.

13. The management apparatus according to claim 12, wherein the second network is the Internet.

14. The management apparatus according to claim 10, wherein the information includes detectable number information indicating the number of electronic devices of the plurality of electronic devices that are detectable by the corresponding agent functions of the electronic devices.

15. A management system comprising:
the management apparatus according to claim 10; and
the plurality of electronic devices.

* * * * *